United States Patent [19]

Nagayoshi et al.

[11] 3,816,204

[45] June 11, 1974

[54] PROCESS FOR PREPARING MATS HAVING CUSHION

[75] Inventors: Akio Nagayoshi; Kenji Morii, both of Osaka, Japan

[73] Assignees: Mitsubishi Petrochemical Company Limited, Tokyo; UC Sangyo Company Limited, Osaka, both of, Japan

[22] Filed: Mar. 16, 1971

[21] Appl. No.: 124,709

[30] Foreign Application Priority Data

Mar. 16, 1970 Japan .............................. 45-22541

[52] U.S. Cl. ................... 156/167, 156/72, 156/210, 156/254, 161/62, 161/67
[51] Int. Cl. ..... D04h 3/16, B32b 31/06, B32b 31/08
[58] Field of Search ............. 156/72, 210, 167, 254, 156/148; 161/62, 65, 66, 67; 264/145, 168, 176, 243

[56] References Cited
UNITED STATES PATENTS

| | | |
|---|---|---|
| 3,010,508 | 11/1961 | Wilson et al. ...................... 156/254 |
| 3,206,343 | 9/1965 | McFarlane ........................... 156/72 |
| 3,266,969 | 8/1966 | Makansi ............................... 156/72 |
| 3,575,751 | 4/1971 | Mizell .................................. 156/72 |
| 3,580,761 | 5/1971 | Boultinghouse ...................... 156/72 |
| 3,676,239 | 7/1972 | Soehngen ........................... 156/167 |

*Primary Examiner*—William J. Van Balen
*Attorney, Agent, or Firm*—Oblon, Fisher, Spivak, McClelland & Maier

[57] ABSTRACT

A mat is provided having a cushion such as a plurality of bristles whose roots are forked. The mat having a cushion is prepared by extruding a melted synthetic resin from a plurality of orifices or a slit in a swinging nozzle onto a surface of a running sheet and adhering the forked roots of the bristles or film on the sheet and cooling it to solidify the same. The extrusion of the melted synthetic resin can be made between two sheets through the swinging nozzle and the bristles laid between the two sheets can be sliced to separate each of the sheets.

11 Claims, 5 Drawing Figures

PATENTED JUN 11 1974     3,816,204

INVENTORS
AKIO NAGAYOSHI
KENJI MORII

BY *Oblon, Fisher and Spivak*
ATTORNEYS

INVENTORS
AKIO NAGAYOSHI
KENJI MORII

BY Oblon, Fisher and Spivak
ATTORNEYS

PROCESS FOR PREPARING MATS HAVING CUSHION

BACKGROUND OF THE INVENTION

1. Field Of Invention:

This invention relates to a mat having a cushion surface characterized by a plurality of bristles whose roots are respectively formed, and further to a process for preparing mats of this type.

2. Description Of Prior Art:

It is well known that a mat having a plurality of bristles can be prepared by molding plastic material such as synthetic resins, for example, polyvinyl chloride, polyethylene, polypropylene, polyurethane and the like. However, the base sheet of the conventional mat heretofore available has been weak and of undesirable thickness. Moreover, the molds used in the manufacture of these mats are very expensive and the cycle of molding is too slow because of the batch system. Also, it is known that a mat having a plurality of strips on the surface of the base sheet can be prepared by adhering these strips thereto, but these strips have lacked firmness in the past.

One method of producing a mat having bristles of the character described features injecting a melted synthetic resin from a plurality of reciprocating nozzles on the surface of a sheet. However, it is difficult to uniformly feed the melted synthetic resin from a reciprocating nozzle and it is equally difficult to work the same in quick cycles. A major deficiency of conventional mats produced in this manner is that the bristles are too weak in bending strength, primarily because of the root structure thereof.

SUMMARY OF THE INVENTION

Accordingly, it is an object of the present invention to provide a mat having a cushion surface formed of a plurality of bristles whose roots are respectively forked.

It is another object of this invention to provide a lawn-like mat having a plurality of bristles whose heads are respectively cut.

It is a further object of this invention to provide a process for preparing a mat having a plurality of bristles which is suitable for quick operation.

It is a still further object of this invention to provide a process for preparing a mat having a plurality of bristles whose heads are cut and whose roots are respectively adhered to the surface of a base sheet.

These and other objects are attained by the present invention embodying a process for preparing a mat having a cushion formed of a plurality of bristles whose roots are forked by extruding a melted synthetic resin from a plurality of orifices or a slit in a swinging nozzle in the form of bristles or film on the surface of a running sheet and adhering the roots of these bristles or film on said sheet and subsequently cooling it. The extruding of the melted synthetic resin can be made between two sheets which are running in parallel by contacting or nearly contacting the orifices or slit of the swinging nozzle with the surfaces of the respective sheets in one swinging cycle. The mat having a plurality of bristles or film laid between two sheets can be used as a packing mat or the bristles laid therebetween can be sliced in the middle portion or on one edge portion by a knife or similar cutter. The mat having a plurality of bristles whose roots are forked and whose heads are sliced can be used as a lawn-like mat.

BRIEF DESCRIPTION OF THE DRAWINGS

Other objects, features and attendant advantages of the present invention will be more fully appreciated as the same becomes better understood from the following detailed description when considered in connection with the accompanying Drawings, wherein.

DETAILED DESCRIPTION OF THE PREFERRED EMBODIMENTS

Figure 1:
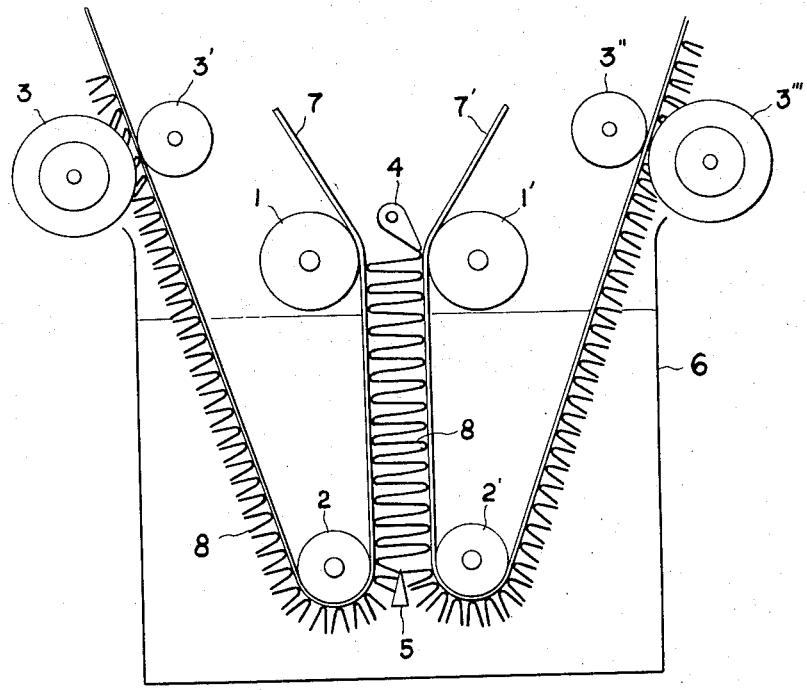
FIG. 1 is a schematic view illustrating an embodiment of apparatus for preparing a mat having a plurality of bristles in accordance with the process of this invention.

Referring now to the Drawings, wherein like reference numerals designate identical or corresponding parts throughout the several views, and more particularly to FIG. 1, two large guide rollers 1, 1' are disposed in parallel relation with a suitable gap therebetween and two small guide rollers 2, 2' are similarly disposed with the same gap therebetween below the two large guide rollers 1, 1'. Two pairs of take-up rollers, 3, 3' and 3'', 3''' are respectively provided beside each of the large guide rollers 1, 1'. A pair of sheets 7, 7' are respectively fed obliquely from the upper side to the adjacent surface areas of the large guide rollers 1, 1' and are run vertically downward in parallel relation between the large guide rollers 1, 1' and the small guide rollers 2, 2'.

The sheets, or strips of material, are turned outwardly from each of the small guide rollers 2, 2', respectively, to be taken up by rollers 3, 3' and 3'', 3'''. A swinging nozzle 4 having a plurality of small orifices for extruding filamental resin is positioned between the two sheets slightly above and between the large guide rollers 1, 1'. The swinging nozzle 4 has a length substantially the same as the width of the sheets 7, 7', the orifices being arranged therein at suitable intervals, and it is swingable between the two sheets, so that the orifices of nozzle 4 respectively contact or nearly contact each surface of the sheets 7, 7' in alternating fashion. Through the orifices of nozzle 4, therefore, a melted synthetic resin is extruded, or injected, in a filamentary shape having a suitable cross-section such as round, square, or the like. The size and intervals of the orifices can be selected depending upon the products being manufactured. When an artificial lawn-like mat is being prepared by the process, the size of orifices can be rather large and the intervals are rather broad. On the contrary, when a cushion mat is being prepared, the size of the orifices can be rather small and the intervals therebetween rather narrow. When two sheets 7, 7' are respectively running through the large guide rollers 1, 1', the small guide rollers 2, 2' and the sets of take-up rollers 3, 3' and 3'', 3''', the melted synthetic resin is extruded by the swinging nozzle 4 through its orifices which are being swung between the two sheets, whereby a plurality of wave-shaped bristles 8 are adhered on the surfaces of sheets 7, 7' at spaced intervals with the roots thereof on each sheet being forked, respectively, and the sheets being bonded together by the bristles 8. A cutting device 5 is positioned between the two small guide rollers 2, 2', so that the wave-shaped bristles 8 bonding the two sheets 7, 7' passing therebetween are sliced by it. A cooling medium such as water fills a cooling tank 6 disposed such that the orifices of the swinging nozzle 4 are positioned just above the cooling medium. The wave-shaped bristles 8 extruded through the orifices of nozzle 4 are dipped in the cooling medium just after the extrusion, to solidify the extruded bristles, so that the bristles 8 are not deformed. The bristles can be solidified by cooling with a blower, if desired, instead of the cooling tank described herein. The deformation of the extruded bristles can further be prevented by providing tension between the two base sheets, or strips, during the period of solidification. In the latter case, the bristles 8 are appropriately stretched so that the wave-shaped bristles are laid substantially perpendicularly between the two sheets and upon being sliced by the cutting device 5 between the small guide rollers 2, 2' form U-shaped roots thereon, each sheet having a plurality of sliced bristles being taken up by the take-up rollers 3, 3' and 3'', 3'''.

In accordance with the process of this invention, a lawnlike mat having a plurality of U-shaped, forked-rooted bristles can be prepared. As a modification, in the extrusion of the bristles, the nozzle 4 can be reciprocated in the sheet running direction during the swinging of the head thereof having the orifices, so that depending upon the tension between the two sheets, the length of the bristles can be enlarged from the amplitude of the orifices. In this process, the sheets 7, 7' are also respectively kept running through the large guide rollers 1, 1', small guide rollers 2, 2' and the take-up rollers 3, 3' and 3'', 3''', the swinging nozzle 4 being swung in the area in which the running sheets 7, 7' are in parallel relation with each other, and the melted resin being extruded in the form of bristles through the orifices of the nozzle 4. The extruded bristles are adhered on the surface of the sheets when the orifices of nozzle 4 are contacted or nearly contacted with the surfaces thereof, respectively. When the base sheets bonded with these bristles are dipped in the cooling tank 6 just after the adhesion thereto of the bristles 8 to solidify the extruded bristles, saw wave-shaped bristles are formed between the sheets and a mat having slanted U-shaped bristles is prepared.

The sheet or strip of material used for this process can be any type of sheet being adhesive to the extruded bristles. It can be a film made of a low melting point synthetic resin such as polyvinyl chloride, polyethylene, polypropylene, polyurethane, and other resins, or a film coated with such a synthetic resin, or a cloth coated with a synthetic resin or even a paper coated with a synthetic resin. If a sheet made of synthetic resin having a melting point higher than that of the melted resin being extruded is used, the sheet can be heated as it approaches the orifices of the swinging nozzle. A swelling agent can be applied to the sheet at the same part, if desired. It is preferable to employ a sheet having a meltable resin on the surface thereof. In a modified version, the sheet can be prepared by extruding a synthetic resin and by injecting, or extruding, the bristles thereon before the sheet solidifies to adhere the roots of the bristles to the sheet, and then solidifying both the sheet and the bristles in the cooling medium. The bristles can be replaced with a film extruded from a slit in the swinging nozzle.

The bristles used for the process can be any type of synthetic resin being extrudable. It is preferable, however, to use resin having high strength, especially high impact strength. In many cases, the bristles are preferably bendable. The resins from which the bristles are formed can be thermoplastic resins and include polyethylene, polypropylene, polyvinylacetate, polyvinylchloride, polyurethane, and the like, and various copolymers and multilayer polymers. The base of the swinging nozzle can be connected to an extruder for supplying the melted synthetic resin and it is preferably rounded at its connection so that the head of the nozzle is swingable around the fulcrum of the connected part. In order to swing the nozzle, both sides of the nozzle shaft are supported in bearing stands with one side of the shaft being a pipe connected to the extruder and the nozzle is jointed to a crank arm having a cam mechanism so that the head of the nozzle swings smoothly in the directions of the sheet surfaces.

The cycle of the swinging movement of the head of the nozzle can be defined by any type of control mechanism, and the shape of the bristles can be modified by the control mechanism. Usually the period wherein the nozzle aproaches the surface of the sheet is longer than the period wherein it passes through the middle area between the running sheets. Accordingly, bristles having the shapes shown in FIGS. 3 and 5 may be provided, in which the roots thereof are forked.

In the above-mentioned embodiment, the mat having two sheets bonded together by the bristles can be taken up, without slicing, to one pair of take-up rollers. This type of mat can be used as packing, a cushion, and in various other ways.

As a modification of this embodiment, a single sheet only may be supplied to a series of a guide roller 1, a guide roller 2, and a pair of take-up rollers 3, 3' and the swinging nozzle 4 having aligned orifices is swung just above the cooling medium to contact or nearly contact the surface of the sheet so that a melted resin is extruded from the orifices to provide the bristles on the sheet. The roots of these bristles are respectively forked to form U-shapes, but the heads of the bristles are looped. Such a mat having loop bristles whose roots are respectively forked can be used as lawn-like mats, cushion mats or the like.

Figure 2:
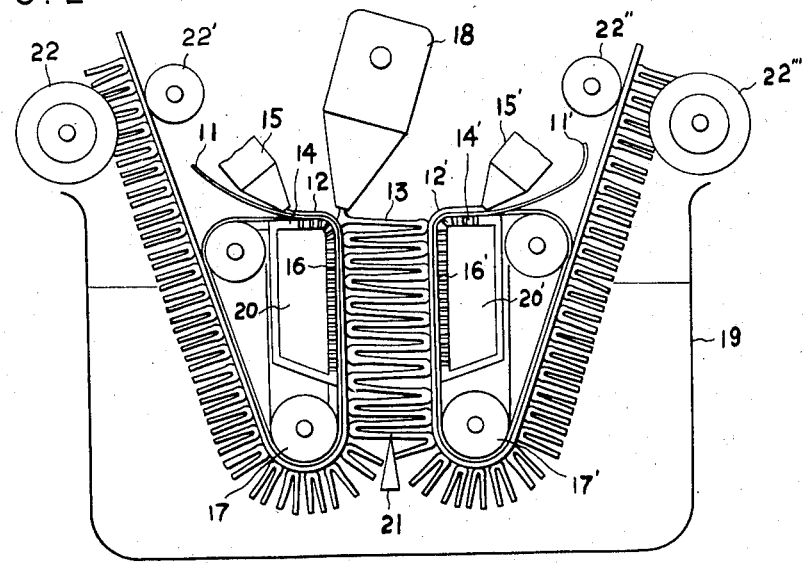
FIG. 2 is another schematic view illustrating another device for preparing a mat having a plurality of bristles in accordance with the process of this invention.

In FIG. 2 there is shown another embodiment of the process of this invention, wherein cloth sheets 11, 11' are respectively supplied to a pair of plates 14, 14' and a melted synthetic resin 12, 12' is extruded on the sheets from extrusion dies 15, 15' to coat the sheet. The coated sheets of cloth 12, 12' are resepctively supplied between vertically disposed, parallel supporters 16, 16' and two guide rollers 17, 17' positioned therebelow. A swinging nozzle 18 having a length substantially the same as the width of the coated cloth sheets and a plurality of aligned orifices spaced therealong is provided between the two sheets just above a cooling medium 19.

A melted resin is extruded from the orifices to form a plurality of bristles 13 whose roots are forked on each sheet. The mat having two cloth sheets 11, 11' bonded with the extruded bristles 13 is cooled in the cooling medium 19. In order to promote the cooling effect and to maintain a uniform gap between the two sheets, suction elements 20, 20' may be provided in the cooling medium. The bristles 13 bonding the two coated cloth sheets 12, 12' can be sliced by a blade 21 as they pass between the lower rollers 17, 17'. Thereafter, the mats having the coated cloth sheets and the plurality of bristles are taken up, respectively, through a corresponding one of a pair of take-up rollers 22, 22' and 22'', 22'''.

Figure 3:
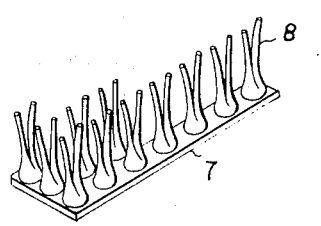
FIG. 3 is a sketch of a part of a mat formed according to this invention having a plurality of bristles whose roots are forked and whose heads are sliced.

The shape of the bristles 8 is shown in FIG. 3, the roots thereof being respectively forked on the sheet 7. It is possible to prepare similar types of mats by replacing the coated cloth sheet with other sheet material. It is also possible to prepare it without using cloth.

The mat having two sheets bonded by bristles having forked roots can be used as packing and cushion mats. It is also possible to prepare a corrugated cardboard-like mat by extruding the melted resin in a form of film from a slit in the swinging nozzle on two extruded sheets, instead of extruding in the form of bristles from the orifices. A mat having only one sheet having bristles whose roots are forked can be used as a lawn-like mat or the like.

Figure 4:
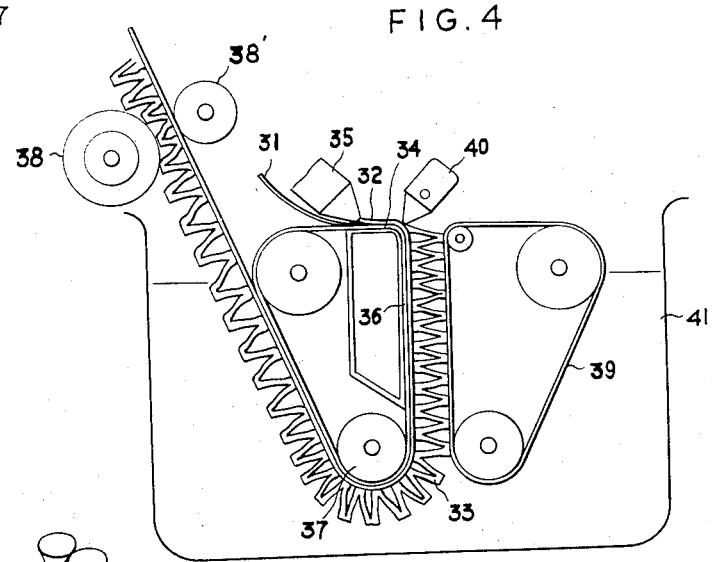
FIG. 4 is a schematic view illustrating another embodiment of the process for preparing a mat in accordance with this invention; and, FIG. 5 is a sketch of a part of a mat having a plurality of bristles whose roots and heads alike are forked.

FIG. 4 illustrates another embodiment of the process of this invention, wherein a single sheet of cloth 31 is supplied to a plate 34 on which a melted resin is extruded through an extruder 35 to form a coated cloth sheet 32. The coated cloth sheet 32 is supplied to a guide 36, a guide roller 37 and a pair of take-up rollers 38, 38'. On the other hand, an endless belt 39 being non-adhesive to the extruded resin, is provided to face the sheet 32 in parallel relation to guide 36 and is run at the same speed. The melted resin is extruded from the swinging nozzle 40 having aligned orifices and which is swinging between the sheet 32 and the endless belt 39, just above the cooling medium 41, to contact or nearly contact the surface of the sheet 32 and of the belt. The extruded bristles 33 are adhered on the sheet 32, to form forked roots, but are not adhered on the endless belt, so that the heads of the bristles are forked and the tops of the heads are flat, respectively, as shown in FIG. 5.

Figure 5:
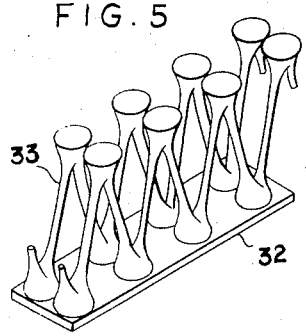

The mat having bristles 33 whose roots and heads alike are forked and have flat tops, respectively, as shown in FIG. 5, can also be used as cushion mats, lawn-like mats and the like. In order to use the mat of this invention as a lawn-like mat, it is preferable to make a plurality of holes in the mat. Such holes can be provided before and after adhering the bristles thereto.

The mat formed according to this invention has a plurality of bristles whose roots are forked so that the adhesiveness and strength of the roots of the bristles are excellent in comparison with conventional mats having bristles. The recoverability of shape of the bristles of this invention is also excellent, so that the bristles can be used for lawn-like mats. The amount of resin of the bristles of this invention can be distributed in the best manner so that the roots of the bristles are adhered with rather broad spacing on the sheet, and the head or middle parts of the bristles are supported in stable condition by the roots of the bristles. Even though the head of the bristles are looped or forked, the support given by the roots of the bristles is so stable as to be recoverable and durable.

The mat having two sheets bonded with bristles of this invention also has excellent recoverability, because of the forked roots of the bristles.

In accordance with the process of this invention, the mat having these excellent properties can be prepared in economical and in continuous fashion, because the cycles of swinging the nozzle can be increased to quite high rates, since the nozzle shaft can be used as the pipe feeding a melted resin to the nozzle swinging around a fulcrum. In comparison with a reciprocating nozzle, the swinging nozzle has unexpected advantages in velocity of the cycle and in mechanical stability, and moreover the swinging nozzle can provide the forked roots for the bristles of the mat.

Obviously, many modifications and variations of the present invention are possible in light of the above teachings. It is therefore to be understood that within the scope of the teachings herein and the appended claims, the invention may be practiced otherwise than as specifically described.

What is claimed as new and desired to be secured by letters patent of the United States is:

1. A process for preparing a mat having a cushion which is characterized by:
   continuously supplying in a substantially vertical direction two sheets of material being adhesive to a melted resin;
   simultaneously extruding a melted resin from at least one orifice in a continuously swinging nozzle which substantially contacts said two sheets during the extreme positions of its swing cycle to cause the resin to adhere to said two sheets at spaced intervals thereon; and
   cooling the mat;
   whereby a mat cushion having a plurality of interconnected forked bristles is formed.

2. A process for preparing a mat according to claim 1, wherein said cushion is a plurality of bristles formed by extruding said melted resin from a plurality of orifices in said swinging nozzle.

3. A process for preparing a mat according to claim 1, wherein said cushion is a corrugated board-like mat which is formed by extruding said melted resin from a slit in said swinging nozzle.

4. A process for preparing a mat according to claim 1, wherein said bristles are sliced to provide separate sheets having cut bristles.

5. A process for preparing a mat according to claim 1, wherein in lieu of said two sheets of material adhesive to said melted resin, the extrusion of the melted resin is made between a sheet being adhesive to a melted resin and an endless belt being non-adhesive to a melted resin.

6. A process for preparing a mat according to claim 1, wherein said sheets are extruded from extruders prior to the extrusion of the melted resin.

7. A process for preparing a mat according to claim 1, wherein said sheets are cloths coated with an extruded resin.

8. A process for preparing a mat according to claim 1, wherein the extrusion of the melted resin is made on said sheets from a plurality of orifices in said swinging nozzle.

9. A process for preparing a mat according to claim 1, wherein said at least one orifice in said swinging nozzle is provided just above a cooling medium.

10. A process for preparing a mat according to claim 1, wherein said swinging nozzle is both swung and reciprocated in a path parallel to said sheets of material being supplied.

11. A process for preparing a mat according to claim 1, wherein the mat is cooled with cool air after extruding the melted resin on said sheets.

* * * * *